(12) United States Patent
Zhao et al.

(10) Patent No.: US 10,739,558 B2
(45) Date of Patent: Aug. 11, 2020

(54) CAMERA OPTICAL LENS (71) Applicant: AAC Technologies Pte. Ltd., Singapore (SG)

(72) Inventors: Xiaonan Zhao, Shenzhen (CN); Rongbao Shi, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 70 days.

(21) Appl. No.: 16/040,614

(22) Filed: Jul. 20, 2018

(65) Prior Publication Data
US 2019/0025546 A1    Jan. 24, 2019

(30) Foreign Application Priority Data

Jul. 20, 2017 (CN) .......................... 2017 1 0597595

(51) Int. Cl.
*G02B 13/18* (2006.01)
*G02B 13/00* (2006.01)
*G02B 9/34* (2006.01)

(52) U.S. Cl.
CPC ............ *G02B 13/004* (2013.01); *G02B 9/34* (2013.01)

(58) Field of Classification Search
CPC ........... G02B 13/004; G02B 9/34; G02B 5/18
USPC .......................... 359/558, 559, 563, 708, 715
See application file for complete search history.

(56) References Cited

U.S. PATENT DOCUMENTS

2002/0118457 A1\* 8/2002 Dowski, Jr. .............. G02B 5/00
359/558

\* cited by examiner

*Primary Examiner* — William Choi
(74) *Attorney, Agent, or Firm* — IPro, PLLC; Na Xu (57) ABSTRACT

The present invention provides a camera optical lens, comprising a lens group having a plurality of lens units and an aperture stop; wherein one of the lens units is provided with a coding surface having a wavefront coding surface near the aperture stop. Due to the wavefront coding surface, the aspherical surface can modulate the distribution of optical path of the camera optical lens.

8 Claims, 12 Drawing Sheets

CAMERA OPTICAL LENS

FIELD OF THE PRESENT DISCLOSURE

This disclosure related to the field of image capturing technologies, and more particularly to a camera optical lens with wavefront coding technology.

DESCRIPTION OF RELATED ART

With the emergence of smart phones in recent years, the demand for miniature camera optical lens is increasing day by day, but the photosensitive devices of general camera optical lens are no other than Charge Coupled Device (CCD) or Complementary metal-Oxide Semiconductor Sensor (CMOS sensor), and as the progress of the semiconductor manufacturing technology makes the pixel size of the photosensitive devices shrink, coupled with the current development trend of electronic products being that their functions should be better and their shape should be thin and small, miniature camera optical lens with good imaging quality therefor has become a mainstream in the market.

In a traditional camera optical lens, the MTF (modulation transfer function) will reduced rapidly with the increase of the defocusing of the lens, which results in loss of image information, noise increase, and poor-quality image. In addition, the MTF will also rapidly reduced according to the increase of decentration (off center), which results in inconsistency of MTF in various fields of view.

Therefore it is necessary to provide an improved camera optical lens for overcoming the above-mentioned disadvantages.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby are only to explain the disclosure, not intended to limit the disclosure.

The definitions of the parameters of the camera optical lens are defined as follows, and the unit of distance, radius, and thickness is millimeter (mm).

f: focal length of the camera optical lens;
 f1: focal length of the first lens unit;
 f2: focal length of the second lens unit;
 f3: focal length of the third lens unit;
 f4: focal length of the fourth lens unit;
 Fno: F number;
 2ω: full image angle of the camera optical lens;
 S1: aperture stop
 R: curvature radius of optical surface of a lens unit;
 R1: curvature radius of an object surface of the first lens unit;
 R2: curvature radius of an image surface of the first lens unit;
 R3: curvature radius of an object surface of the second lens unit;
 R4: curvature radius of an image surface of the second lens unit;
 R5: curvature radius of an object surface of the third lens unit;

R6: curvature radius of an image surface of the third lens unit;

R7: curvature radius of an object surface of the fourth lens unit;

R8: curvature radius of an image surface of the fourth lens unit;

R9: curvature radius of an object surface of the glass plate;

R10: curvature radius of an image surface of the glass plate;

d: thickness of the lens unit at a center thereof along the optical axis; or distance between two lens units along the optical axis;

d0: distance from the aperture stop to the object surface of the first lens unit;

d1: thickness of the first lens unit;

d2: distance from the image surface of the first lens unit to the object surface of the second lens unit;

d3: thickness of the second lens unit;

d4: distance from the image surface of the second lens unit to the object surface of the third lens unit;

d5: thickness of the third lens unit;

d6: distance from the image surface of the third lens unit to the object surface of the fourth lens unit;

d7: thickness of the fourth lens unit;

d8: distance from the image surface of the fourth lens unit to the object surface of the glass plate;

d9: thickness of the glass plate;

d10: distance from the image surface of the glass plate to the imaging surface.

nd: refractive index along d line;
nd1: refractive index of the first lens unit along d line;
nd2: refractive index of the second lens unit along d line;
nd3: refractive index of the third lens unit along d line;
nd4: refractive index of the fourth lens unit along d line;
nd5: refractive index of the glass plate along d line;
vd: abbe umber;
v1: abbe number of the first lens unit;
v2: abbe number of the second lens unit;
v3: abbe number of the third lens unit;
v4: abbe number of the fourth lens unit;
v5: abbe number of the glass plate;

TTL: total track length (total optical length from the object surface of the first lens unit to the imaging surface along the optical axis);

LB: distance from the image surface of the fourth lens unit to the imaging surface (including the thickness of the glass plate);

$$y=(x^2/R)/[1+\{1-(k+1)(x^2/R^2)\}1/2]+A4x^4+A6x^6+A8x^8+A10x^{10}+A12x^{12}+A14x^{14}+A16x^{16} \quad (1);$$

where k is conic coefficient, A4, A6, A8, A10, A12, A14, and A16 are aspherical coefficients.

For better understanding, all aspherical surfaces of the lens units are configured according to formula (1). It should be understood, however, the aspherical surfaces are not restricted to the shape configured by formula (1).

Figure 1:
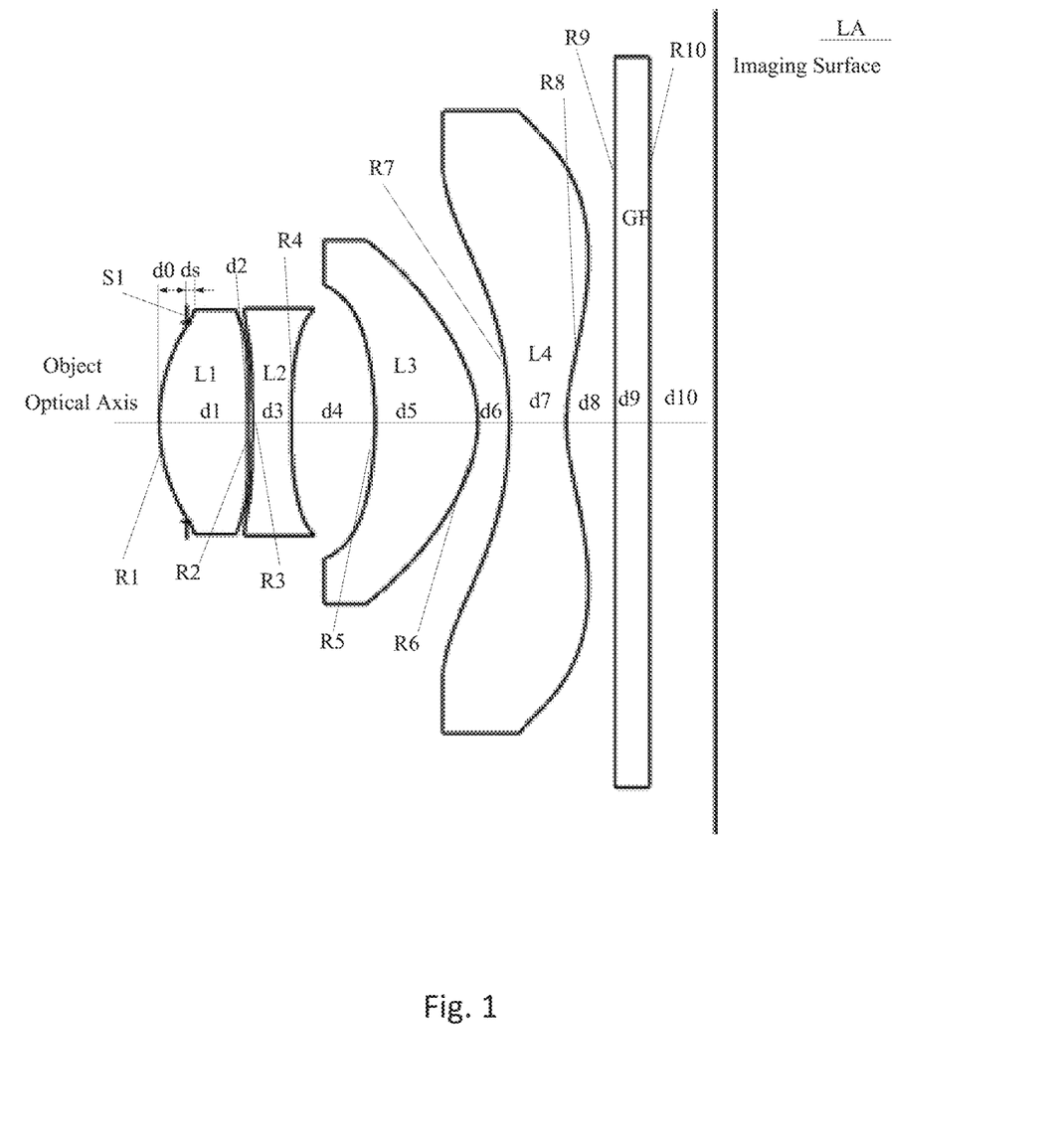
FIG. 1 is an isometric view of a camera optical lens in accordance with a first exemplary embodiment of the present invention.

Referring to FIG. 1, a camera optical lens LA, in accordance with an exemplary embodiment of the present invention is disclosed. The camera optical lens LA includes a lens group including at least one lens unit. In the embodiment, the lens group includes, in an order from an image side to an object side, a first lens unit L1, a second lens unit L2, a third lens unit L3, and a fourth lens unit L4.

The camera optical lens LA further includes an aperture stop S1 arranged in the lens group. Among the lens units, a coding surface is configured, which means, at least one of the lens units, e.g. the first lens unit L1 is provided with a coding surface at an object side surface or an image surface. The coding surface defines a wavefront coding surface near the aperture stop S1, at the object side of the aperture stop or at the image side of the aperture stop.

Preferably, rise of dots in the coding surface satisfy the following condition:
Z=Z1+Z2, where Z1 is rise of traditional surface, and Z2 is rise of the wavefront coding surface. Preferably, Z1 satisfies even aspherical equation.

In the embodiment, Z2 of the wavefront coding surface satisfies the following condition:

$$Z2 = \frac{B\lambda}{2\pi(n-1)(D/2)^3}(x^3+y^3), x^2+y^2 \le (D/2)^2,$$

where B is the wavefront coding index, n is the refractive index of the material forming the wavefront coding surface at dominant wavelength λ, D is aperture size (diameter) of the wavefront coding surface, x/y is the coordinate of wavefront coding surface.

In addition, the wavefront coding index B satisfies the following condition:
$5\pi \le B \le 50\pi$, and better satisfies $5\pi \le B \le 10\pi$.

The camera optical lens further satisfies the following condition:
0≤ds≤0.2 mm, where ds is the distance from the aperture stop S1 to an edge of the wavefront coding surface along the optical axis. Better, the distance satisfies 0.02≤ds≤0.1 mm.

The wavefront coding surface is arranged on the object side or the image surface of the aperture stop.

Due to the wavefront coding surface, the aspherical surface can modulate the distribution of optical path of the camera optical lens LA, which makes MTF (modulation transfer function) non-sensitive to the defocusing (actual imaging surface deviating from desired/ideal position), and ensures the consistency of MTF of various fields of view. Further, no null point appears along the MTF curvature from high frequency to low frequency, and all image information is retained, which is beneficial for restoring clear image and expanding focal depth.

And, due to the wavefront coding surface, the aspherical surface can modulate the distribution of optical path of the camera optical lens LA, which makes MTF (modulation transfer function) non-sensitive to the decentration of the lens units, and ensures the consistency of MTF of various fields of view. Further, no null point appears along the MTF curvature from high frequency to low frequency, and all image information is retained, which is beneficial for restoring clear image and expanding focal depth.

Embodiment 1

Referring to FIG. 1, the camera optical lens LA includes a first lens unit L1, a second lens unit L2, a third lens L3, a fourth lens L4, and an aperture stop S1. The coding surface is arranged at an object side of the aperture stop S1, i.e., L1R2. Following conditions are satisfied:

B=5π, f1=2.20, f2=−5.56, f3=1.69, f4=−1.40, f=2.92, FOV (field of view)=75.6°, IH (image height)=2.297 mm, TTL=3.4, and Fno=2.

Other optical parameters of the camera optical lens LA is listed in Table 1 and Table 2, in which curvature radiuses of the lens units (R), thicknesses of lens units and distances between lens units (d), refractive indexes (nd), abbe numbers (vd) are listed in Table 1, and conic coefficients (k) and aspherical coefficients are listed in Table 2.

TABLE 1

|  | R | d |  | nd |  | vd |
|---|---|---|---|---|---|---|
| S1 | ∞ | d0 = | −0.167 |  |  |  |
| R1 | 1.095 | d1 = | 0.540 | nd1 | 1.5441 v1 | 56.04 |
| R2 | 10.217 | d2 = | 0.030 |  |  |  |
| R3 | −15.053 | d3 = | 0.237 | nd2 | 1.6355 v2 | 23.97 |
| R4 | 4.690 | d4 = | 0.512 |  |  |  |
| R5 | −2.457 | d5 = | 0.630 | nd3 | 1.5441 v3 | 56.04 |
| R6 | −0.733 | d6 = | 0.192 |  |  |  |
| R7 | −2.573 | d7 = | 0.350 | nd4 | 1.5352 v4 | 56.12 |
| R8 | 1.116 | d8 = | 0.300 |  |  |  |
| R9 | ∞ | d11 = | 0.210 | ndg | 1.5168 vg | 64.21 |
| R10 | ∞ | d12 = | 0.405 |  |  |  |

TABLE 2

|  | Conic Coefficient | Aspherical Coefficient | | | | | | | |
|---|---|---|---|---|---|---|---|---|---|
|  | k | A4 | A6 | A8 | A10 | A12 | A14 | A16 | B |
| R1 | 4.6858E−01 | −3.7334E−02 | −3.0321E−01 | 1.1982E+00 | −1.8513E+00 | −5.4514E+00 | 1.3925E+01 | −8.1522E+00 | 5π |
| R2 | 2.9549E+01 | −3.5507E−01 | −2.4833E−01 | −1.2009E+00 | 3.1438E+00 | 8.3589E−01 | −5.6625E−01 | −3.3233E+00 |  |
| R3 | 0.0000E+00 | −1.6624E−01 | −3.1666E−01 | −4.0197E−01 | 7.7376E−01 | 5.1530E+00 | 1.8965E+00 | −1.1517E+01 |  |
| R4 | 0.0000E+00 | 2.3684E−01 | 2.2268E−01 | −6.3758E−01 | 1.7817E+00 | −6.4360E−01 | 7.1193E−01 | 6.1805E−01 |  |
| R5 | 5.3290E+00 | −1.2943E−01 | 3.6054E−01 | −7.5422E−01 | −2.4750E−01 | 9.8234E−01 | 7.4815E−01 | −2.3679E+00 |  |
| R6 | −3.1694E+00 | −2.0857E−01 | 1.6733E−01 | −7.4355E−02 | −7.3428E−02 | 2.9684E−02 | 5.7800E−02 | −3.0707E−02 |  |
| R7 | −2.5293E+00 | −7.9181E−02 | 3.1157E−02 | 7.5220E−03 | −1.4378E−03 | −4.5032E−04 | −3.1335E−04 | 1.1577E−04 |  |
| R8 | −1.0806E+01 | −1.4134E−01 | 8.0572E−02 | −3.6000E−02 | 7.8466E−03 | −1.7283E−04 | −2.9738E−04 | 4.5880E−05 |  |

Figure 2A:
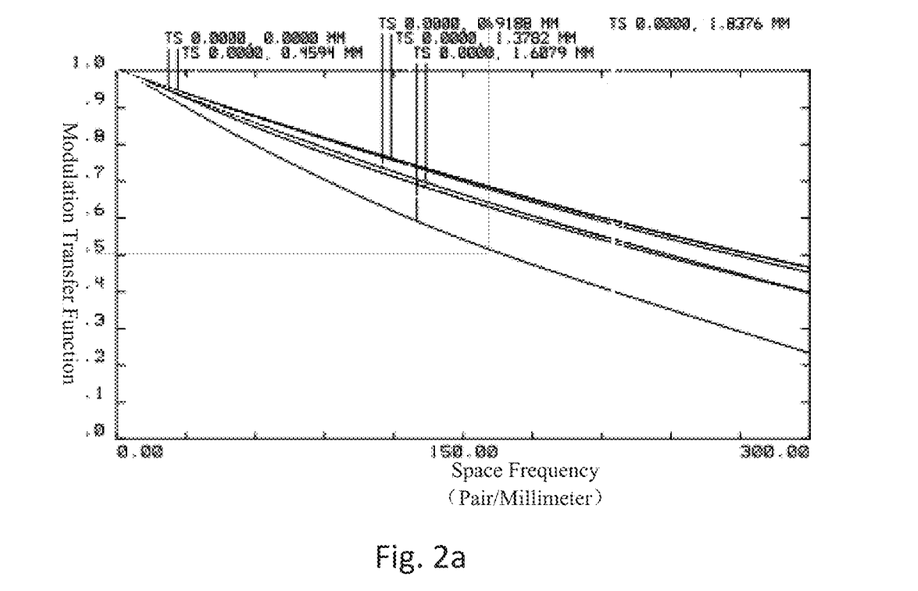
FIG. 2a is MTF curve of the camera optical lens in FIG. 1 at focusing condition.
Figure 2B:
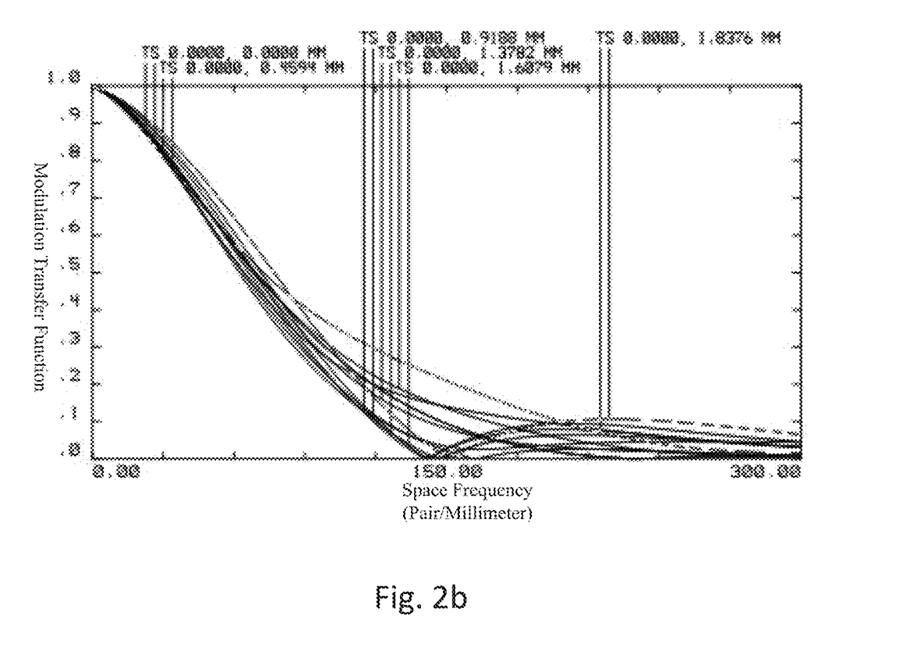
FIG. 2b is MTF curve of the camera optical lens in FIG. 1, at defocusing of 0.024 mm.
Figure 2C:
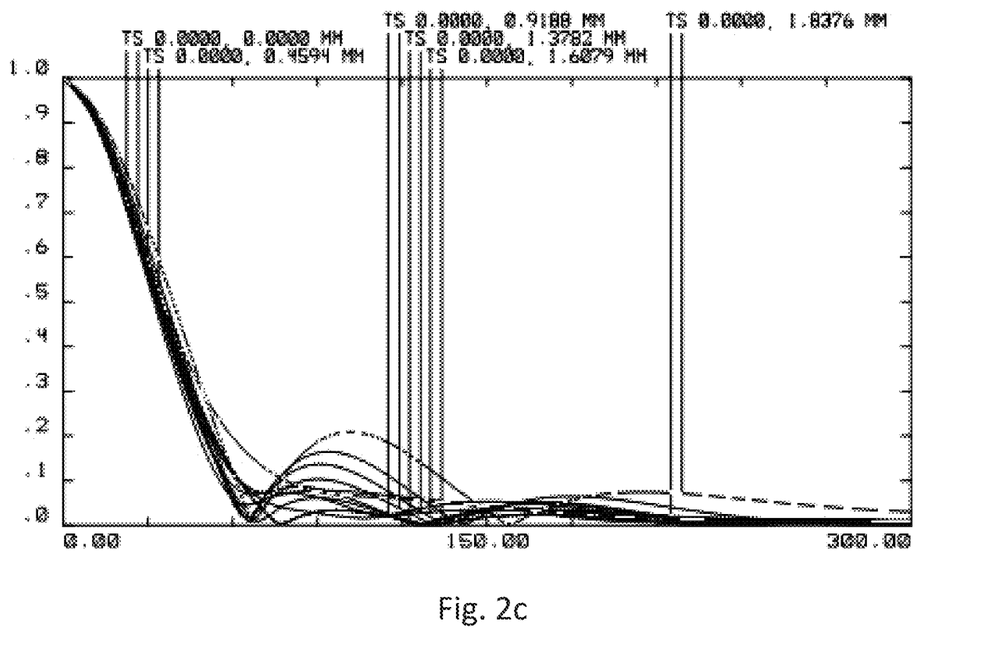
FIG. 2c is MTF curve of the camera optical lens in FIG. 1, at defocusing of 0.048 mm.

MTF curves of traditional camera optical lens are shown in FIGS. 2a-2c. FIG. 2a is MTF curve at focusing condition. FIG. 2b is MTF curve at defocusing of 0.024 mm. FIG. 2c is MTF curve at defocusing of 0.048 mm. It can be seen that with the increase of defocusing, MTF is rapidly dropping down, and null points appear, which results in loss of image information, and difficulties to restore clear image. The focal depth of the tradition camera optical lens (DOF) satisfies: DOF=±2λ(F/#)²=±0.006 mm.

Figure 3A:
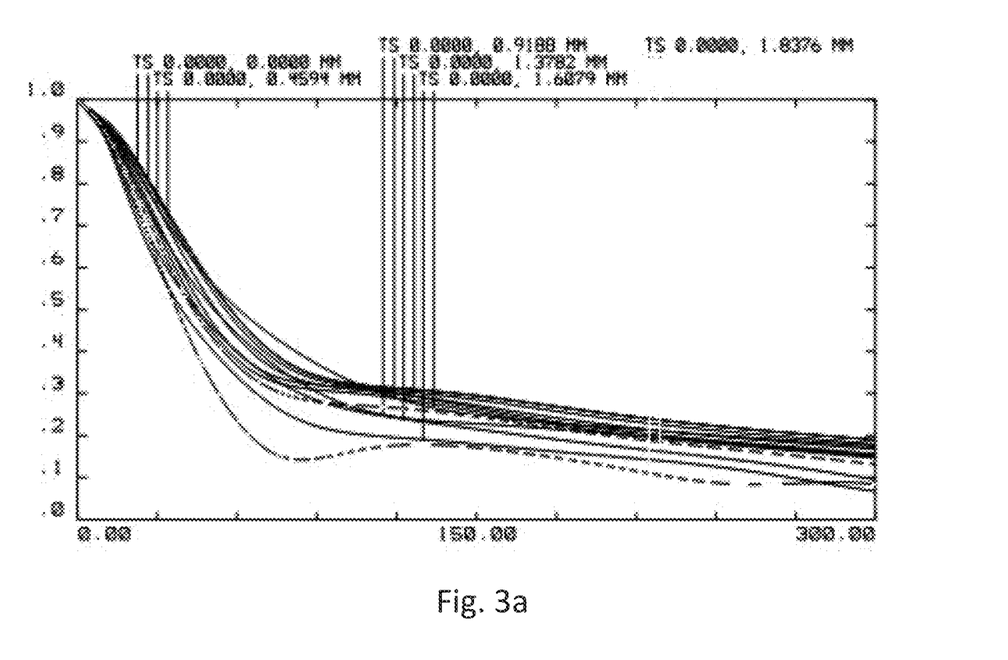
FIG. 3a is MTF curve of the camera optical lens in FIG. 1 additionally provided with a wavefront coding surface, at focusing condition.
Figure 3B:
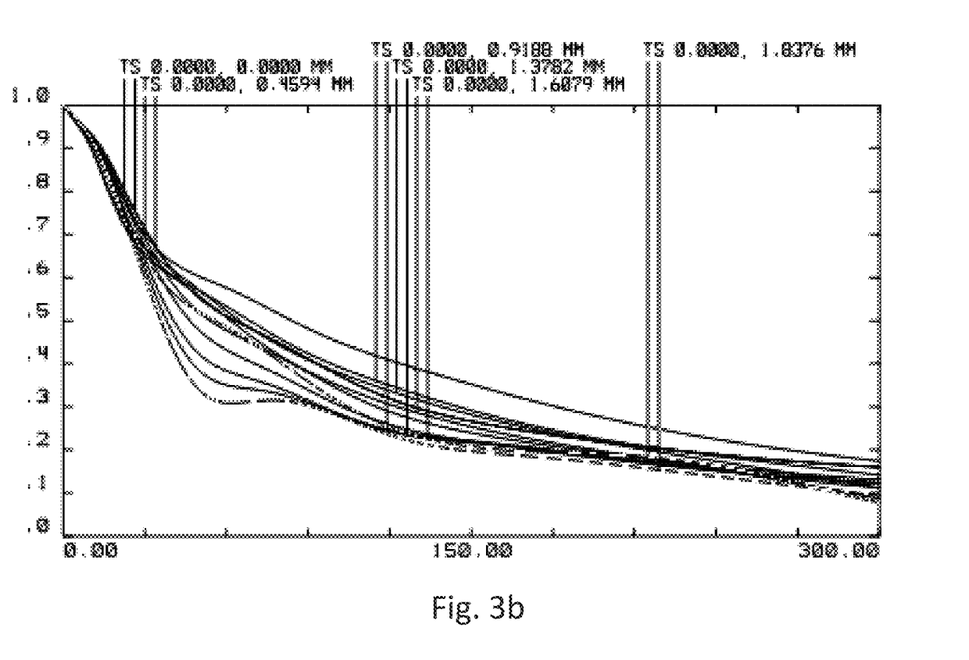
FIG. 3b is MTF curve of the camera optical lens in FIG. 1 additionally provided with a wavefront coding surface, at defocusing of 0.024 mm.
Figure 3C:
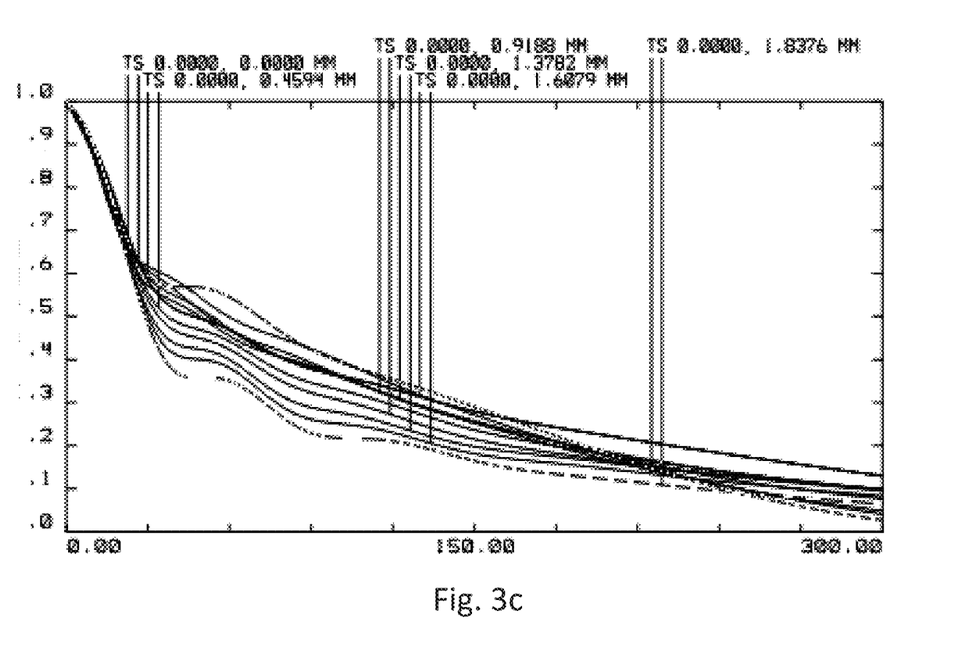
FIG. 3c is MTF curve of the camera optical lens in FIG. 1 additionally provided with a wavefront coding surface, at defocusing of 0.048 mm.

When the wavefront coding surface is provided, the MTF curves of the camera optical lens are shown in FIGS. 3a-3c. FIG. 3a is MTF curve of the camera optical lens provided with the wavefront coding surface, at focusing condition. FIG. 3b is MTF curve of the camera optical lens additionally provided with the wavefront coding surface, at defocusing of 0.024 mm. FIG. 3c is MTF curve of the camera optical lens additionally provided with the wavefront coding surface, at defocusing of 0.048 mm. Due to the wavefront coding surface, the aspherical surface can modulate the distribution of optical path of the camera optical lens LA, which makes MTF non-sensitive to the defocusing (actual imaging surface deviating from desired/ideal position), and ensures the consistency of MTF of various fields of view. Further, no null point appears along the MTF curvature from high frequency to low frequency, and all image information is retained, which is beneficial for restoring clear image and expanding focal depth. The focal depth (DOF) is now 0.048 mm, which is 8 times the DOF of traditional camera optical lens.

Figure 4A:
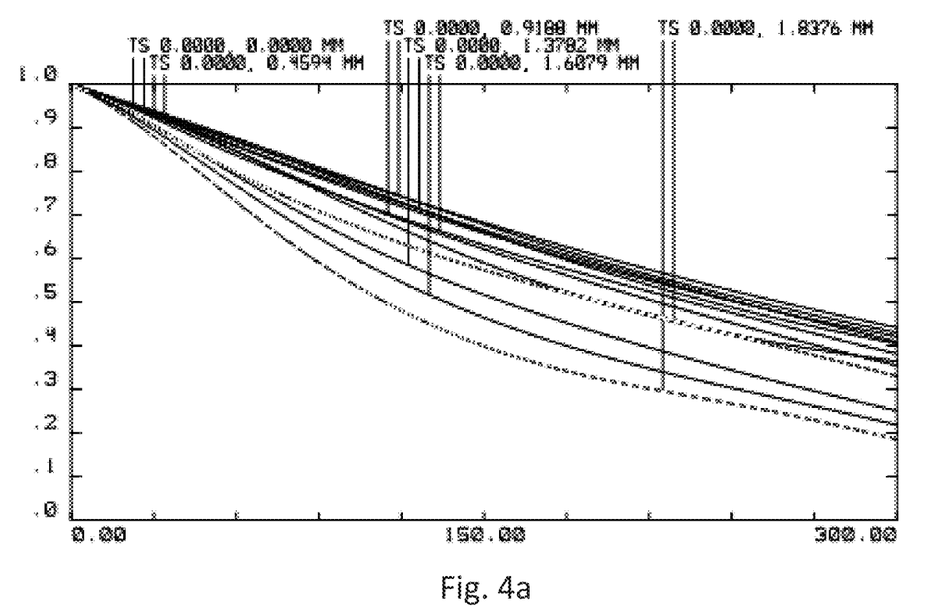
FIG. 4a is MTF curve of the camera optical lens in FIG. 1 when the decentration of L1R2 is 0.001 mm.
Figure 4B:
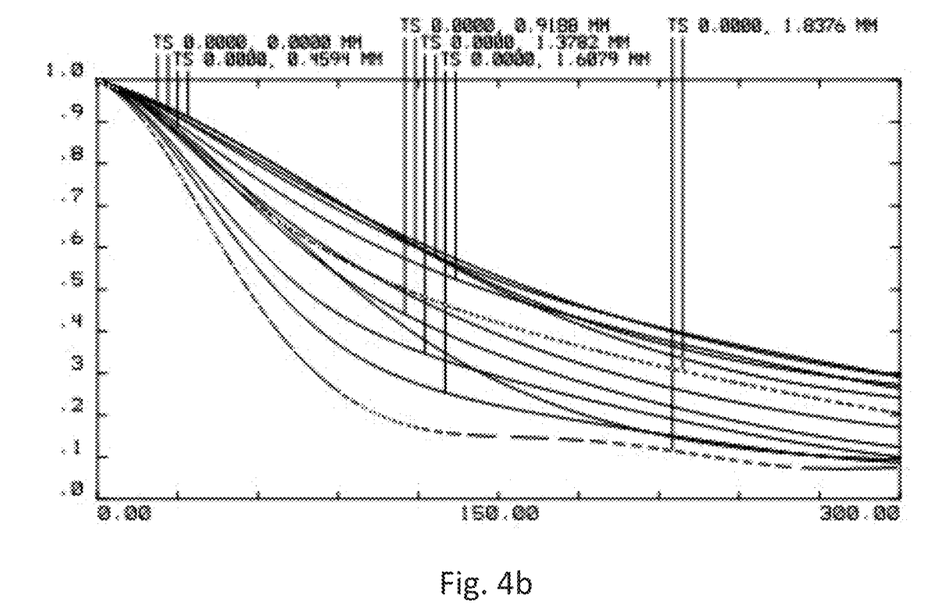
FIG. 4b is MTF curve of the camera optical lens in FIG. 1 when the decentration of L1R2 is 0.003 mm.

MTF curves at decentration are shown in FIGS. 4a and 4b. FIG. 4a is MTF curve of the camera optical lens when the decentration of L1R2 is 0.001 mm. FIG. 4b is MTF curve of the camera optical lens when the decentration of L1R2 is 0.003 mm. It can be seen that with the increase of decentration, MTF is rapidly dropping down, and null points appear, which results in loss of image information, and difficulties to restore clear image. Tolerance of decentration of traditional camera optical lens is about 0.001 mm, which means the camera optical lens may satisfy predefined requirements with decentration smaller than 0.001 mm.

Figure 5A:
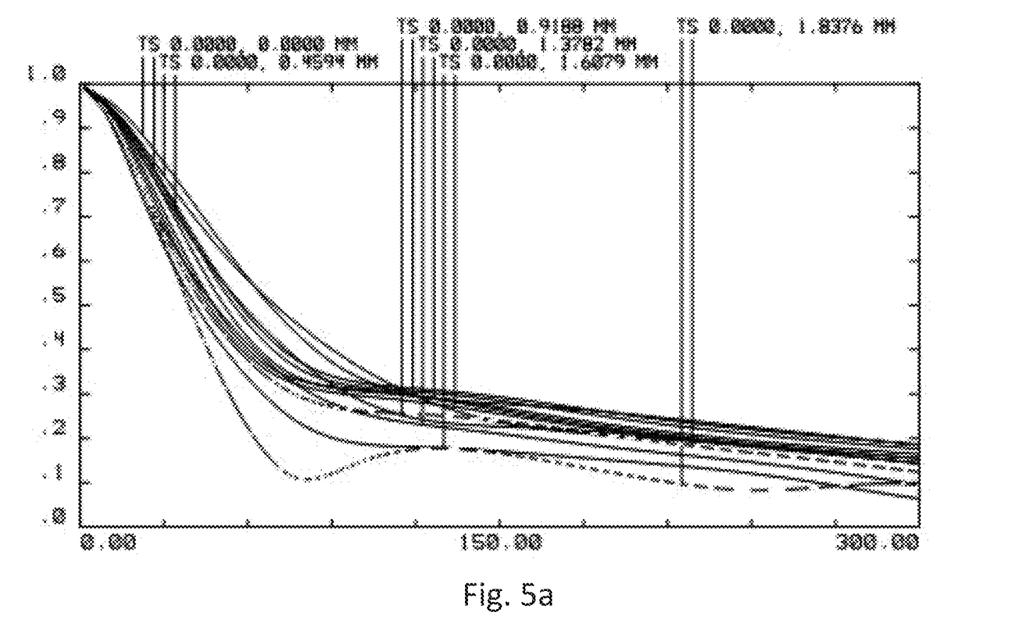
FIG. 5a is MTF curve of the camera optical lens in FIG. 1 additionally provided with the wavefront coding surface when the decentration of L1R2 is 0.001 mm.
Figure 5B:
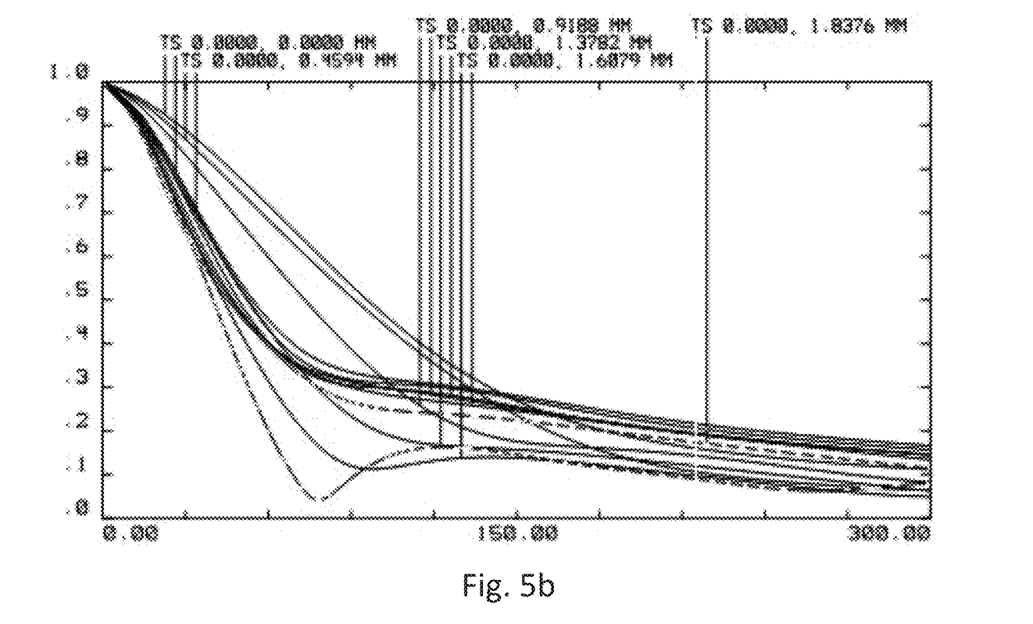
FIG. 5b is MTF curve of the camera optical lens in FIG. 1 additionally provided with the wavefront coding surface when the decentration of L1R2 is 0.003 mm.

MTF curves at decentration, provided with wavefront coding surface, are shown in FIGS. 5a-5b. FIG. 5a is MTF curve of the camera optical lens additionally provided with the wavefront coding surface when the decentration of L1R2 is 0.001 mm. FIG. 5b is MTF curve of the camera optical lens additionally provided with the wavefront coding surface when the decentration of L1R2 is 0.003 mm. Due to the wavefront coding surface, the aspherical surface can modulate the distribution of optical path of the camera optical lens LA, which makes MTF (modulation transfer function) non-sensitive to the decentration of the lens units, and ensures the consistency of MTF of various fields of view. Further, no null point appears along the MTF curvature from high frequency to low frequency, and all image information is retained, which is beneficial for restoring clear image. The tolerance of decentration, provided with wavefront coding surface, is 0.003 mm.

Embodiment 2

Figure 6:
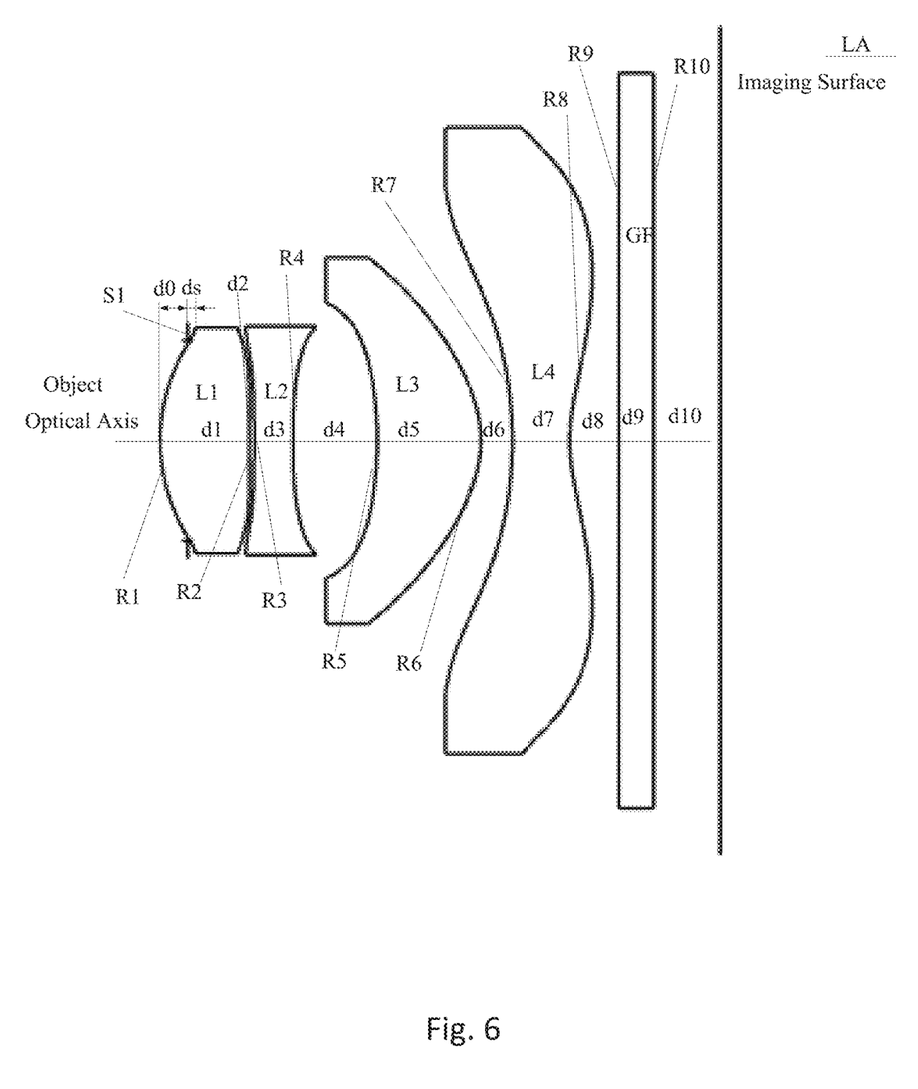
FIG. 6 is an isometric view of a camera optical lens in accordance with a second exemplary embodiment of the present invention.

Referring to FIG. 6, the camera optical lens LA includes a first lens unit L1, a second lens unit L2, a third lens L3, a fourth lens L4, and an aperture stop S1. The coding surface is arranged at an image side of the aperture stop S1, i.e., L1R2. Following conditions are satisfied:

B=5π, f1=2.62, f2=−5.77, f3=1.37, f4=−2.08, f=2, FOV (field of view)=83°, IH (image height)=1.814 mm, TTL=2.967, and Fno=2.

Other optical parameters of the camera optical lens LA is listed in Table 3 and Table 4, in which curvature radiuses of the lens units (R), thicknesses of lens units and distances between lens units (d), refractive indexes (nd), abbe numbers (vd) are listed in Table 3, and conic coefficients (k) and aspherical coefficients are listed in Table 4.

TABLE 3

|  | R | d |  | nd |  | vd |
|---|---|---|---|---|---|---|
| R1 | 1.118 | d1 = | 0.364 | nd1 | 1.5439 v1 | 55.9500 |
| R2 | 4.518 | d2 = | 0.351 |  |  |  |
| S1 | ∞ | d0 = | −0.4 |  |  |  |
| R3 | −5.321 | d3 = | 0.235 | nd2 | 1.6422 v2 | 22.41 |
| R4 | 12.725 | d4 = | 0.060 |  |  |  |
| R5 | −1.738 | d5 = | 0.618 | nd3 | 1.5439 v3 | 55.9500 |
| R6 | −0.589 | d6 = | 0.030 |  |  |  |
| R7 | 0.889 | d7 = | 0.289 | nd4 | 1.5439 v4 | 55.9500 |

TABLE 3-continued

| | R | d | | nd | vd |
|---|---|---|---|---|---|
| R8 | 0.442 | d8 = | 0.296 | | |
| R9 | ∞ | d11 = | 0.210 | ndg  1.5168 | vg  64.21 |
| R10 | ∞ | d12 = | 0.514 | | |

TABLE 4

| | Conic Coefficient | Aspherical Coefficient | | | | | | |
|---|---|---|---|---|---|---|---|---|
| | k | A4 | A6 | A8 | A10 | A12 | A14 | A16 |
| R1 | −1.6582E+01 | 1.2561E+00 | −4.8663E+00 | 1.8369E+01 | −6.4015E+01 | 1.6904E+02 | −2.9253E+02 | 2.1698E+02 |
| R2 S1 | −5.0361E+01 | −2.2403E−02 | −1.2078E+00 | −4.6245E+00 | 1.2999E+02 | −8.7899E+02 | 2.2129E+03 | −1.6095E+03 |
| R3 | 4.5554E+01 | −7.8682E−01 | −4.0308E+00 | 3.1428E+01 | −1.8769E+02 | 5.0247E+02 | −5.0180E+02 | 3.8433E+01 |
| R4 | 9.5839E+01 | 3.6672E−01 | −7.7105E+00 | 3.9634E+01 | −1.2569E+02 | 2.4021E+02 | −2.5165E+02 | 1.1227E+02 |
| R5 | −5.5650E+00 | 1.3351E+00 | −9.8800E+00 | 3.9675E+01 | −9.0875E+01 | 1.2458E+02 | −9.5036E+01 | 3.0666E+01 |
| R6 | −7.8689E−01 | 6.6534E−01 | −2.8042E+00 | 1.0561E+01 | −2.9320E+01 | 5.2805E+01 | −4.6914E+01 | 1.5602E+01 |
| R7 | −3.2194E+00 | −1.2187E+00 | 1.5968E+00 | −9.4038E−01 | −8.1316E−02 | 3.8278E−01 | −1.5816E−01 | 1.7932E−02 |
| R8 | −3.2337E+00 | −7.2517E−01 | 1.1166E+00 | −1.1682E+00 | 7.8825E−01 | −3.3376E−01 | 7.9469E−02 | −8.0072E−03 |

Figure 7A:
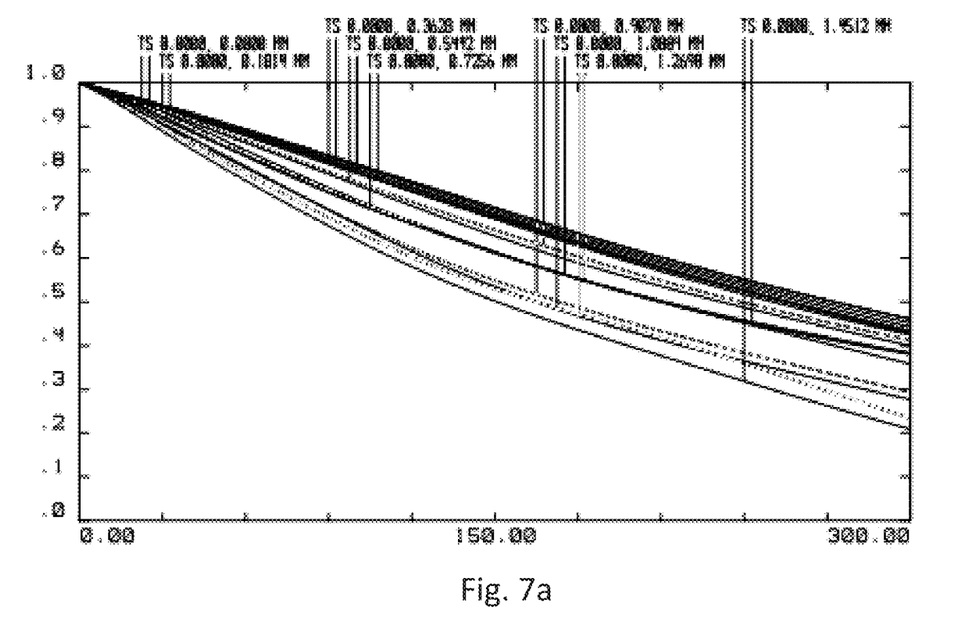
FIG. 7a is MTF curve of the camera optical lens in FIG. 6 at focusing condition.
Figure 7B:
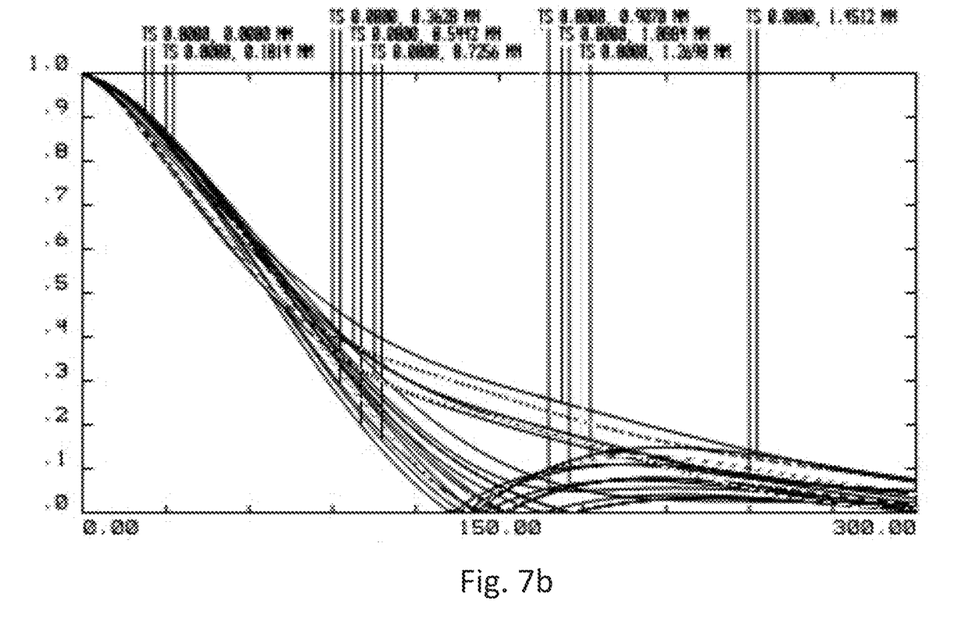
FIG. 7b is MTF curve of the camera optical lens in FIG. 6, at defocusing of 0.024 mm.
Figure 7C:
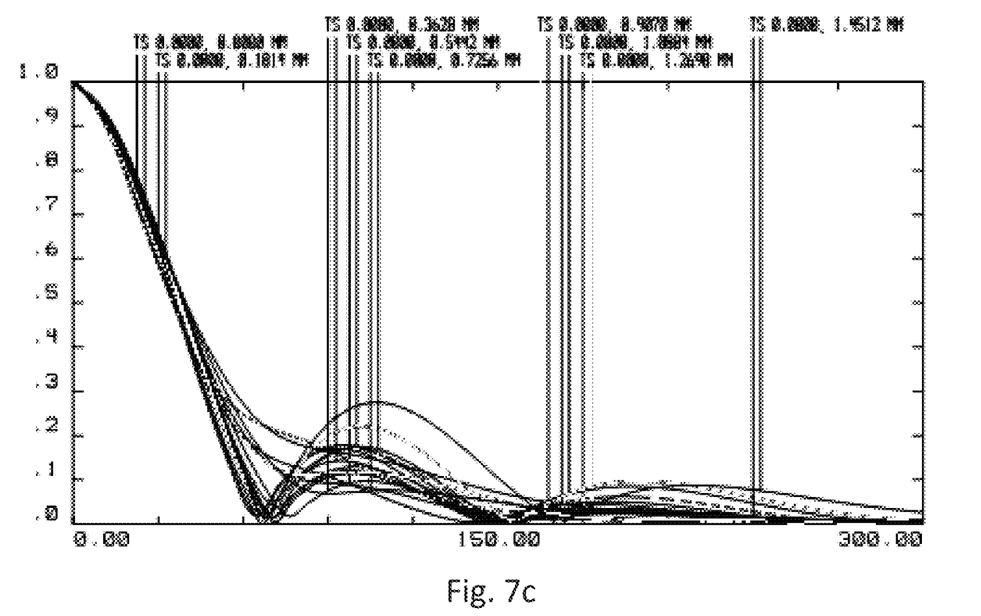
FIG. 7c is MTF curve of the camera optical lens in FIG. 6, at defocusing of 0.048 mm.

MTF curves of traditional camera optical lens are shown in FIGS. 7a-7c. FIG. 7a is MTF curve at focusing condition. FIG. 7b is MTF curve at defocusing of 0.024 mm. FIG. 7c is MTF curve at defocusing of 0.048 mm. It can be seen that with the increase of defocusing, MTF is rapidly dropping down, and null points appear, which results in loss of image information, and difficulties to restore clear image. The focal depth of the tradition camera optical lens (DOF) satisfies: $DOF = \pm 2\lambda(F/\#)^2 = \pm 0.005$ mm.

Figure 8A:
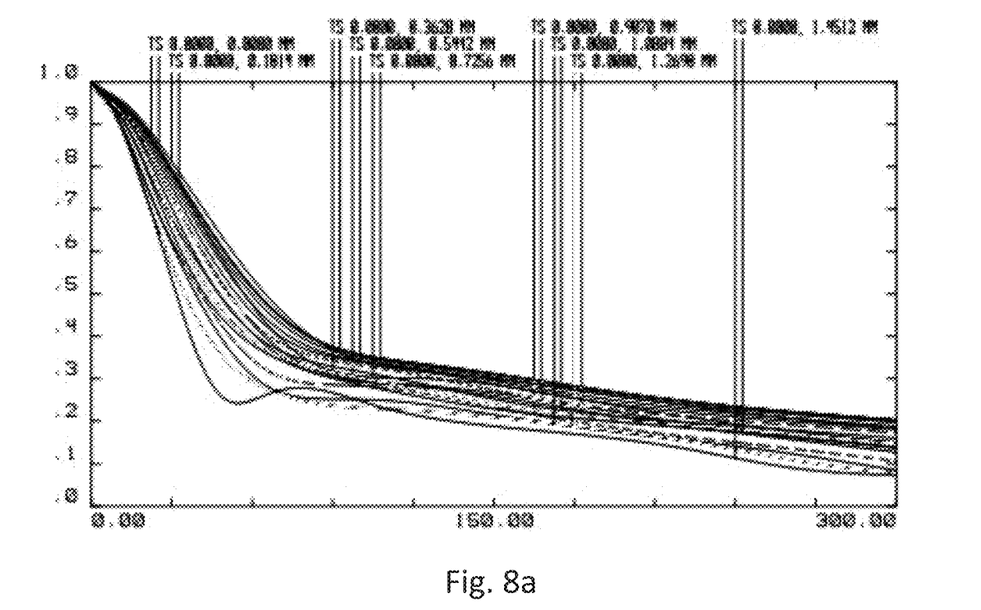
FIG. 8a is MTF curve of the camera optical lens in FIG. 6 additionally provided with a wavefront coding surface, at focusing condition.
Figure 8B:
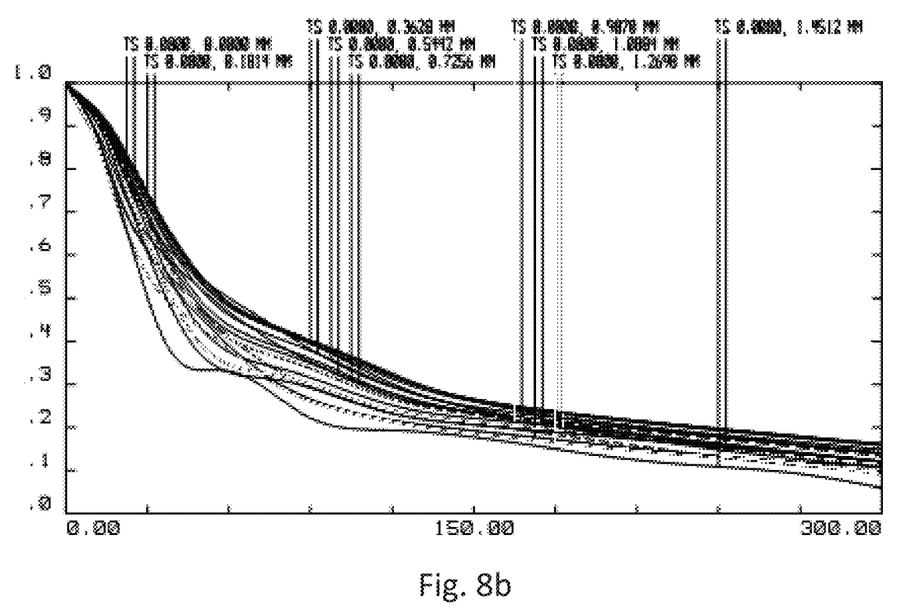
FIG. 8b is MTF curve of the camera optical lens in FIG. 6 additionally provided with a wavefront coding surface, at defocusing of 0.024 mm.
Figure 8C:
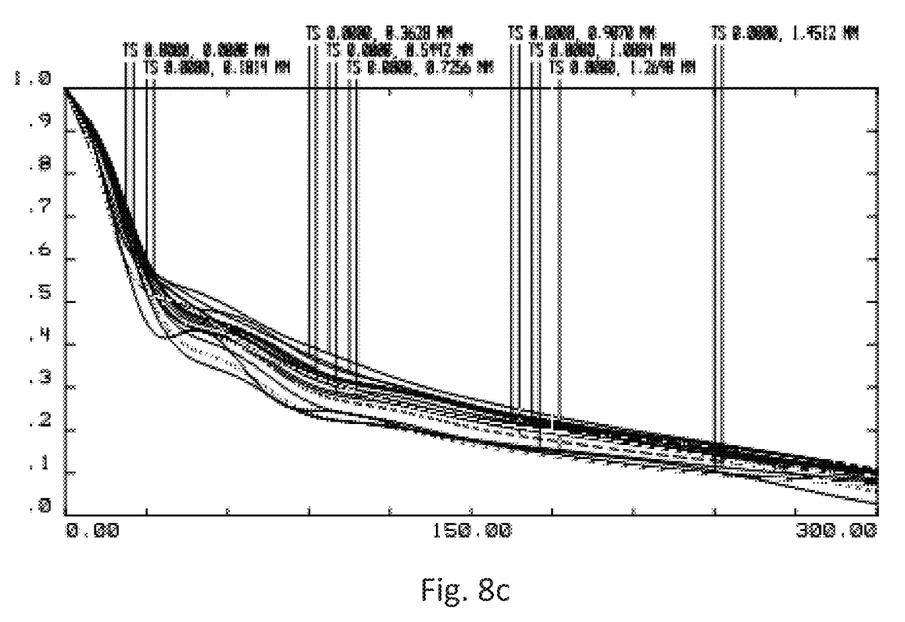
FIG. 8c is MTF curve of the camera optical lens in FIG. 6 additionally provided with a wavefront coding surface, at defocusing of 0.048 mm.

When the wavefront coding surface is provided, the MTF curves of the camera optical lens are shown in FIGS. 8a-8c. FIG. 8a is MTF curve of the camera optical lens provided with the wavefront coding surface, at focusing condition. FIG. 8b is MTF curve of the camera optical lens additionally provided with the wavefront coding surface, at defocusing of 0.024 mm. FIG. 8c is MTF curve of the camera optical lens additionally is provided with the wavefront coding surface, at defocusing of 0.048 mm. Due to the wavefront coding surface, the aspherical surface can modulate the distribution of optical path of the camera optical lens LA, which makes MTF non-sensitive to the defocusing (actual imaging surface deviating from desired/ideal position), and ensures the consistency of MTF of various fields of view. Further, no null point appears along the MTF curvature from high frequency to low frequency, and all image information is retained, which is beneficial for restoring clear image and expanding focal depth. The focal depth (DOF) is now 0.04 mm, which is 8 times the DOF of traditional camera optical lens.

Figure 9A:
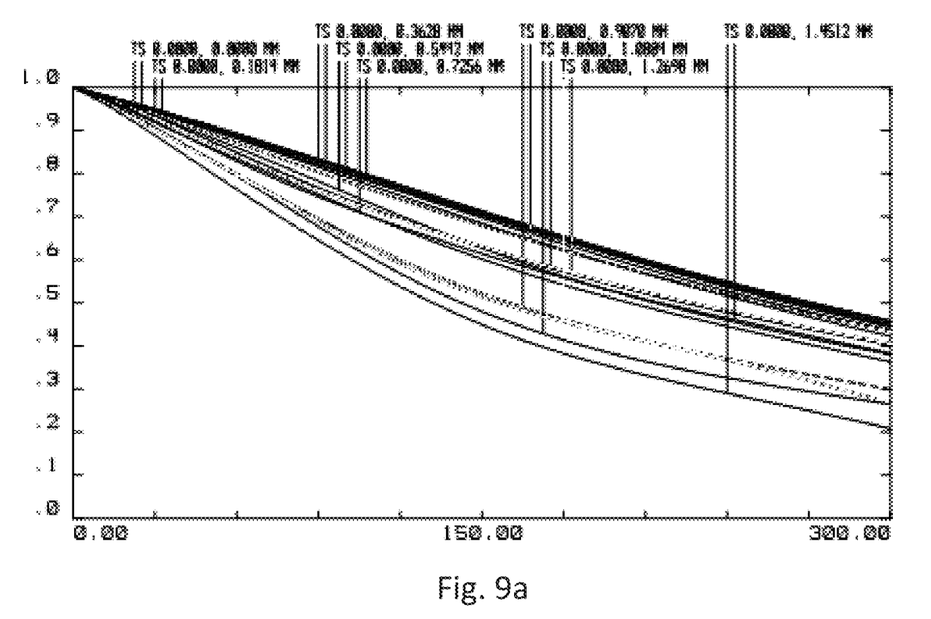
FIG. 9a is MTF curve of the camera optical lens in FIG. 6 when the decentration of L1R1 is 0.001 mm.
Figure 9B:
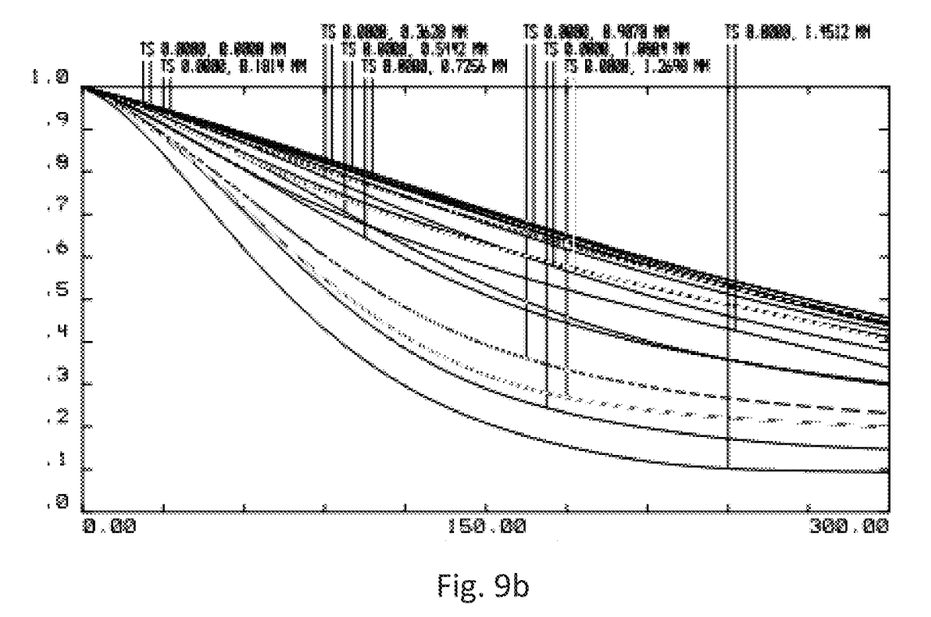
FIG. 9b is MTF curve of the camera optical lens in FIG. 6 when the decentration of L1R1 is 0.003 mm.

MTF curves at decentration are shown in FIGS. 9a and 9b. FIG. 9a is MTF curve of the camera optical lens when the decentration of L1R1 is 0.001 mm. FIG. 9b is MTF curve of the camera optical lens when the decentration of L1R2 is 0.003 mm. It can be seen that with the increase of decentration, MTF is rapidly dropping down, and null points appear, which results in loss of image information, and difficulties to restore clear image. Tolerance of decentration of traditional camera optical lens is about 0.001 mm, which means the camera optical lens may satisfy predefined requirements with decentration smaller than 0.001 mm.

Figure 10A:
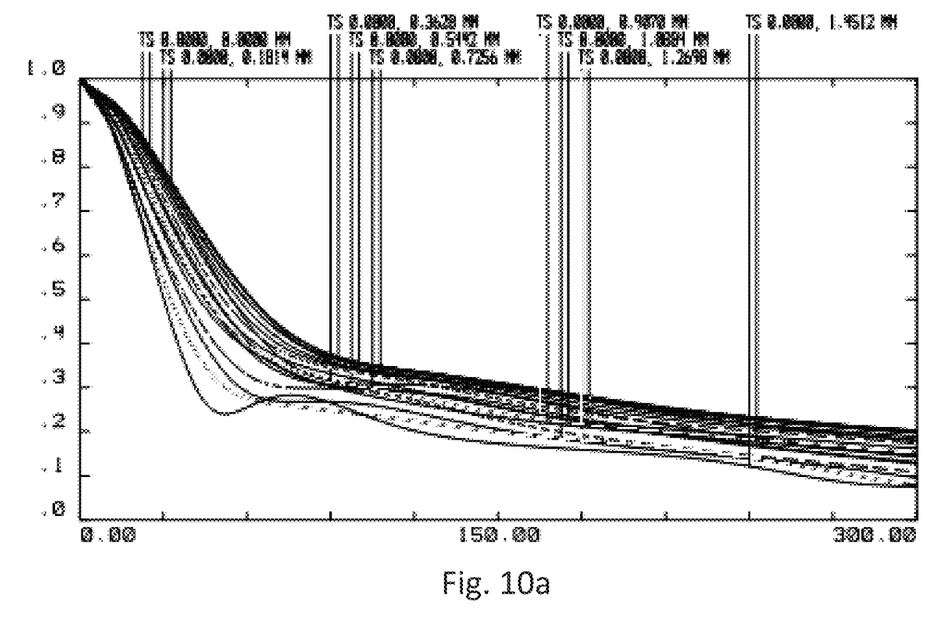
FIG. 10a is MTF curve of the camera optical lens in FIG. 6 additionally provided with the wavefront coding surface when the decentration of L1R1 is 0.001 mm.
Figure 10B:
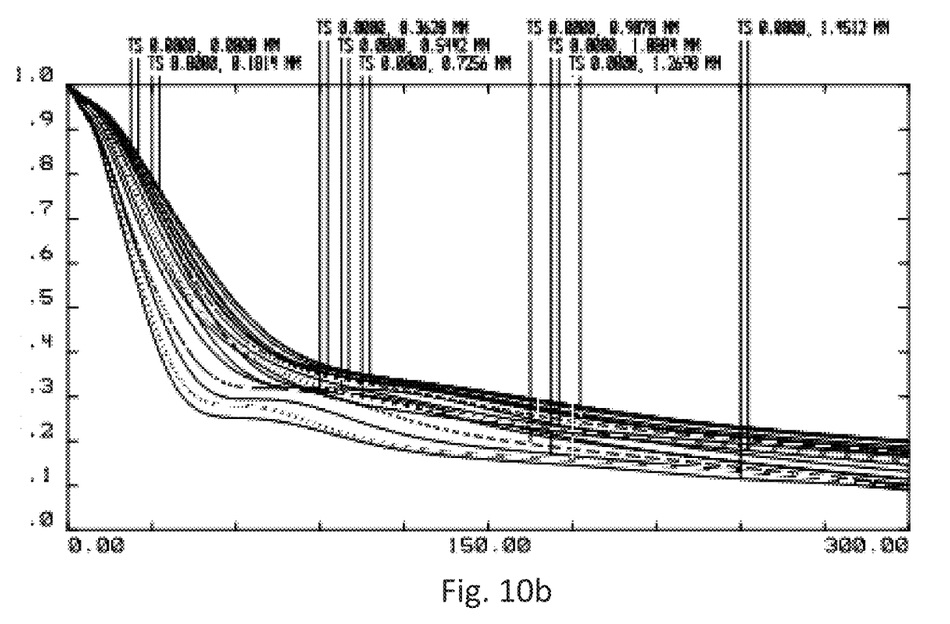
FIG. 10b is MTF curve of the camera optical lens in FIG. 6 additionally provided with the wavefront coding surface when the decentration of L1R1 is 0.003 mm.

MTF curves at decentration, provided with wavefront coding surface, are shown in FIGS. 10a-10b. FIG. 10a is MTF curve of the camera optical lens additionally provided with the wavefront coding surface when the decentration of L1R1 is 0.001 mm. FIG. 10b is MTF curve of the camera optical lens additionally provided with the wavefront coding surface when the decentration of L1R1 is 0.003 mm. Due to the wavefront coding surface, the aspherical surface can modulate the distribution of optical path of the camera optical lens LA, which makes MTF (modulation transfer function) non-sensitive to the decentration of the lens units, and ensures the consistency of MTF of various fields of view. Further, no null point appears along the MTF curvature from high frequency to low frequency, and all image information is retained, which is beneficial for restoring clear image. The tolerance of decentration, provided with wavefront coding surface, is 0.003 mm.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens, comprising a lens group having a plurality of lens units and an aperture stop; wherein one of the lens units is provided with a coding surface having a wavefront coding surface near the aperture stop; wherein a rise Z of the coding surface satisfies the following condition: Z=Z1+Z2, where Z1 is a rise of a traditional surface, and Z2 is a rise of the wavefront coding surface.

2. The camera optical lens as described in claim 1, wherein Z1 satisfies an even aspherical equation.

3. The camera optical lens as described in claim 1, wherein Z2 satisfies the following condition:

$$Z2 = \frac{B\lambda}{2\pi(n-1)(D/2)^3}(x^3 + y^3), \quad x^2 + y^2 \leq (D/2)^2$$

Where B is wavefront coding index, n is the refractive index of the material forming the wavefront coding surface at dominant wavelength λ, D is aperture size (diameter) of the wavefront coding surface, x/y is the coordinate of wavefront coding surface.

4. The camera optical lens as described in claim 3, wherein the wavefront coding index B satisfies the following condition:

5π≤B≤50 π.

5. The camera optical lens as described in claim 1 further satisfying the following condition:

0≤ds ≤0.2 mm, where ds is a distance from the aperture stop to an edge of the wavefront coding surface along the optical axis.

6. The camera optical lens as described in claim 1, wherein the lens group includes 4 lens units.

7. The camera optical lens as described in claim 1, wherein the coding surface is located at an object side of the aperture stop.

8. The camera optical lens as described in claim 1, wherein the coding surface is located at an image side of the aperture stop.

* * * * *